G. G. Noah.
Making Paste.
No. 73115 — Patented Jan. 7, 1867.
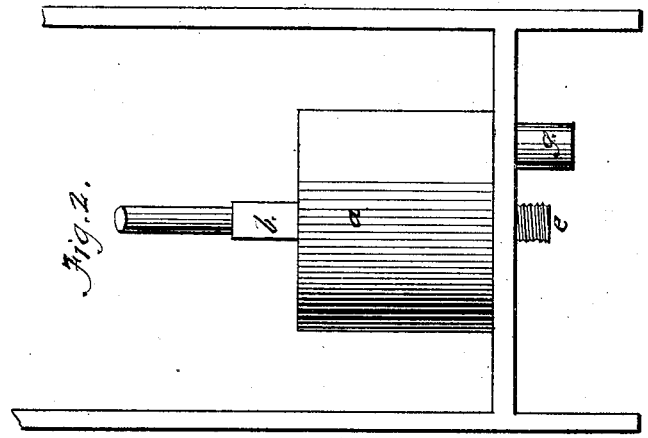
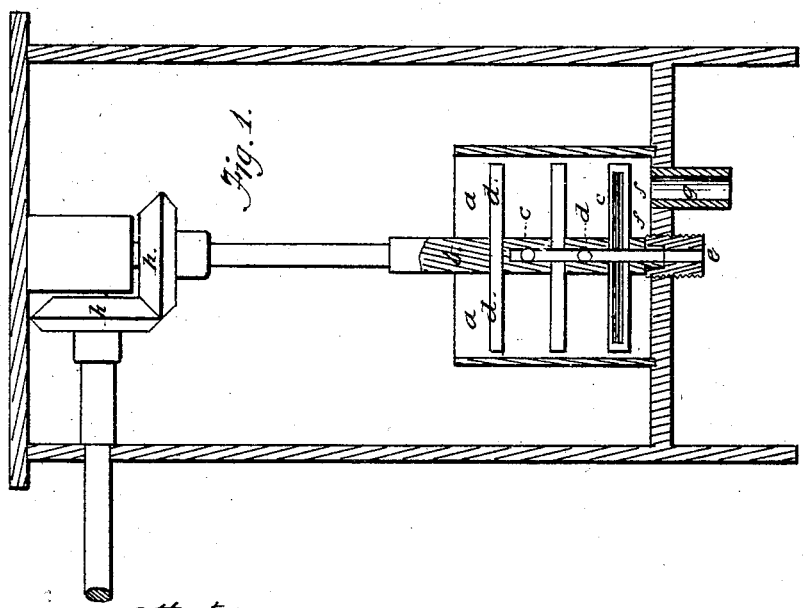 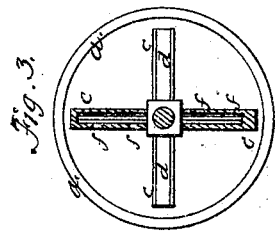
attest:
Henry W Walker
James F. Ward.
George G Noah

United States Patent Office.

GEORGE G. NOAH, OF BOSTON, MASSACHUSETTS.

Letters Patent No. 73,115, dated January 7, 1868; antedated December 26, 1867.

---

MACHINE FOR MAKING PASTE.

---

The Schedule referred to in these Letters Patent and making part of the same.

---

TO ALL WHOM IT MAY CONCERN:

Be it known that I, GEORGE G. NOAH, of Boston, in the county of Suffolk, and the Commonwealth of Massachusetts, have invented a new and useful Improvement in Machines for Making Paste; and I do hereby declare that the following is a full, clear, and exact description of the construction and operation of the same, reference being had to the annexed drawings, making a part of this specification, in which—

Figure 1 is a vertical section.

Figure 2 is a vertical elevation of tub and discharge and inducting-pipe and shaft.

Figure 3 is a sectional plan of tub, showing revolving arms.

Like parts are indicated by same letters in all drawings.

The nature of my invention consists in causing steam to permeate the contents of the tub, and cooking the same, at the same time that the contents of the tub are being thoroughly mixed together by revolving arms, firmly attached to a revolving shaft, some of which are perforated and some not, and through the perforated ones of which the steam is inducted into the contents of the tub.

I believe paste has been made before, where steam was used, and where it was mixed by machinery, but in a very different manner from what my invention does it. I claim to have made an essential improvement on all previous methods, in that by it the contents of the tub are being cooked and boiled by steam at the same time that they are being thoroughly mixed together, in the manner hereafter to be described. The necessary things to make the best quality of paste are the thoroughly mixing it together and cooking and boiling at one and the same time; and this, I claim, my invention does in the best manner and at the least expense.

To enable others skilled in the art to make and use my invention, I will now proceed to describe its construction and operation.

$a\ a$ are the tub which holds the paste, and which may be made of any requisite size, according to the amount of paste to be made. It may be made of wood or iron, or any other suitable material. $b$ is the revolving shaft, revolving in the centre of the tub, and is hollow up to above the highest perforated arm, so that steam from this shaft may pass into the perforated arms. $d\ d$ are the unperforated arms, firmly attached to the revolving shaft $b$, and revolving with it for the purpose of mixing the paste. $c\ c$ are the perforated arms, hollow, and into which the steam passes from the hollow shaft $b$, and from which the steam passes through perforations in the arms into the contents of the tub. $e\ e$ are the inducting-pipe, introducing the steam to the hollow shaft and perforated arms. $f\ f$ are the perforated holes in the perforated arms, through which the steam passes into and cooks and boils the paste. The arms here are put at right angles to each other, and a perforated arm is put at the bottom, and two unperforated ones between that and the next perforated arm above. But this order is not requisite; they may be put at acute or oblique angles to each other, but I think the present the best arrangement of the arms, both as to the angle at which they shall be placed to each other, and the order one above another. All the arms may be perforated. $g$ is the discharge-pipe, by which the paste, when properly mixed, cooked, and boiled, is let out of the tub into suitable vessels for use. $h\ h$ are the bevel-gears, so arranged as to move the shaft.

Thus it will be seen that the shaft, once set in motion, with the steam let on, the whole mass in the tub will be permeated with the steam, and thus boiled and cooked at the same time that it is thoroughly mixed by the revolving arms.

Having thus described the construction and operation of my machine, what I claim as new, and desire to secure by Letters Patent, is—

1. Introducing steam into the perforated arms, and into the contents of the tub, for the purpose above described, and in the manner substantially as set forth, or by any equivalent means.

2. The combination of arms attached to the shaft, wholly perforated or partly perforated, and partly not perforated, for the purpose above described, and in the manner substantially as set forth.

GEORGE G. NOAH.

Witnesses:
HENRY W. WALKER,
JAMES F. WARD: